Patented May 19, 1936

2,041,279

UNITED STATES PATENT OFFICE 2,041,279

ASPHALTIC COMPOSITION

Ulric B. Bray, Palos Verdes Estates, Calif., assignor to Union Oil Company of California, Los Angeles, Calif., a corporation of California No Drawing. Original application April 13, 1934, Serial No. 720,488. Divided and this application October 29, 1935, Serial No. 47,319

5 Claims. (Cl. 106—31)

The present invention relates to an improved bituminous emulsion which is particularly adapted for paving operations in which it is desirable to pre-mix or stock pile the road building material before it is applied to the road. The invention relates particularly to an oil continuous type emulsion which is one in which the asphalt comprises the continuous phase and the aqueous solution comprises the discontinuous phase. In the present discussion of my invention, I may refer to this emulsion as an inverted emulsion. My invention also includes a process for producing such emulsions.

The present application is a division of my copending application Serial Number 720,488, filed April 13, 1934.

It is an object of my invention to produce an oil continuous type asphalt emulsion or inverted emulsion which is particularly adapted to be mixed with asphaltic concrete to temper the same in order to permit its workability at relatively low temperatures.

It is another object of the invention to produce an asphaltic composition which is adapted for road building which contains an oil continuous type asphalt emulsion and which is adapted to temper asphaltic concrete in order to permit its workability at low temperatures, as, for example, at atmospheric temperature.

Another object of the invention resides in producing an inverted emulsion which can itself be mixed with warm stone to give a mixture which is capable of stock piling and then employed for road building purposes when desired without further heating and in which asphalt comprises the continuous phase and water the discontinuous phase.

Another object of the invention resides in a method of operation for producing an asphaltic composition containing an inverted or oil continuous type asphalt emulsion.

Various other objects and advantages of my invention will become apparent to those skilled in the art by the following description of the preferred manner of compounding the preferred composition which is given herein for the purpose of illustrating and explaining the invention and which is not to be considered as limiting.

It is well known that in order to pave roads with asphaltic concrete, the latter must be applied to the road bed soon after it has been withdrawn from the hot mixing plant in which the asphalt concrete is produced by hot mixing melted asphalt and hot stones or aggregate. If the asphaltic concrete is allowed to cool somewhat, it hardens into an unworkable mass. It cannot be stockpiled and then employed at will but must be applied to the road bed before it has cooled to the minimum workability temperature of the asphaltic concrete. In order to permit workability of the asphaltic concrete long after it has passed the minimum temperature at which it is ordinarily workable, it has been known to mix a small amount, say 2 to 4% by weight, of emulsified light road oil or cut-back asphalt with the hot asphaltic concrete. These emulsions are water continuous phase type emulsions. The mechanism of this tempering action obtained by the addition of emulsified oils to hot mixed asphaltic concrete is not commonly understood but I believe that the reason lies in the discovery that when such emulsions are mixed with the hot asphaltic concrete, an inversion of the emulsion occurs. In other words, the ordinary water continuous phase emulsion contains from 45% and above by weight of water. I have observed that when this is mixed with hot asphaltic concrete, a portion of the water evaporates and in some instances, the evaporation of the water down to approximately 30% by weight will cause an inversion of phases and it is believed that this inversion of phases permits workability of the asphaltic concrete when it has cooled to below the minimum workable temperature.

As a result of the above observation, I have discovered that an inverted emulsion, that is, one in which the asphalt is the continuous phase and the aqueous solution is the discontinuous phase, can be used directly for the purpose of tempering a hot mixed asphaltic concrete, or as another feature of my invention, the inverted emulsion can itself be mixed directly with warm stone at a temperature, say 150 to 250° F., to give a mixture which is capable of stock piling and being applied to the road after it is cooled to lower temperatures. Such an inverted emulsion will generally contain from 65 to 80% by weight of asphalt and the difference corresponding to water containing alkali or soap or other emulsifying agent.

To produce the inverted emulsion, I may first emulsify an asphalt produced, for example, from Poso Creek crude oil, the asphalt having about 150 penetration at 77° F., and is emulsified with alkaline water containing 0.2% of sodium hydroxide by weight, by mixing the melted asphalt with the alkaline water with suitable agitation. The proportion of water to asphalt corresponds to 75% asphalt and 25% water which gives a viscous but water continuous emulsion. I then add while hot with agitation an additional amount of sodium hydroxide in the form of a 10% solution so that the total alkali content of the water present is 0.8%. This higher concentration of sodium hydroxide in the aqueous phase causes the emulsion to undergo practically complete inversion, giving an oil continuous emulsion with the water distributed mainly as the internal phase.

I have further devised a method for producing the aforementioned asphaltic composition whereby the same type of results as described above may be obtained in a more simple and direct manner. This method of operation consists in forming the inverted emulsion in situ while the heated rock and asphalt are in the same mixing machine or in another mixing machine. The operation for producing my asphaltic composition and the inverted emulsion in situ will be better understood from the following examples:

Example 1

Stone or aggregate ordinarily employed for road building is first heated to a temperature of approximately 250° F. and is then thoroughly mixed in a suitable mixing machine with approximately 5% by weight of melted asphalt having a penetration of 150 at 77° F., a melting point of 100° F. and a ductility of 100+cm. at 77° F. which has been obtained by distilling Poso Creek crude.

After thoroughly mixing the asphalt and stone, the hot asphaltic concrete is allowed to cool to a somewhat lower temperature of say 220° F. A solution of approximately 4% by weight of water containing 0.5% of sodium hydroxide is then added and the mixing continued until the water solution is thoroughly mixed with the asphaltic concrete. During the addition of the aqueous solution and for a period thereafter, considerable vaporization of water takes place so that the ratio of water to bitumen resulting finally is favorable towards an inverted or oil continuous type asphaltic emulsion. The amount of water to be vaporized favoring the inverted type emulsion will comprise approximately one-half of the 4% added so that the final composition will contain 5% by weight asphalt and 2% by weight of water. The concentration of sodium hydroxide is also such to favor an inverted emulsion when using Poso Creek asphalt in contrast to the small portions of sodium hydroxide required to give a water continuous emulsion with the same asphalt. The composition will comprise stone or aggregate which is coated with asphalt and containing a film of water between the particles of coated aggregate. It is believed that the film of water permits workability of the asphaltic composition at low temperatures and the composition, therefore, is capable of stock piling. By stock piling, is meant that the asphaltic compositions may be stored in mounds from which portions may be withdrawn when required.

In some instances, it may be desirable to add proper agents to the aqueous phase or to the asphalt before, during or after mixing which favor the formation of the oil continuous type asphaltic emulsion. Such materials comprise alkaline earth bases, as, for example, calcium, barium, magnesium hydroxides or soluble salts of alkaline earth metals, as, for example, the chlorides, nitrates, or soluble sulfates.

Example 2

Stone or aggregate ordinarily employed in producing asphaltic concrete is heated to a temperature of approximately 225° F. and is passed into a mixing machine consisting of an ordinary pug mill. Into the pug mill are run a stream of hot paving asphalt and another stream of water containing the proper emulsifying agent favorable for forming an inverted emulsion upon the stone. For example, the water may contain 0.5% sodium resinate and 0.2% calcium chloride. Regulation of the two streams is employed so as to obtain the proper proportions of bitumen and aqueous solution for the aggregate being treated.

A point of advantage in the process is that almost any grade of water may be employed, and in some cases there may be sufficient emulsifying or de-emulsifying constituents in the aggregate to form the film of inverted emulsion on each particle of aggregate so that a minimum amount of such materials will need to be added.

While I have described preferred embodiments of my invention, it will be understood that the above description is not to be considered as limiting my invention as many variations may be made by those skilled in the art without departing from the spirit thereof, which I claim to be:

I claim:

1. A process for producing an asphaltic composition adapted for paving roads and the like and containing an oil continuous type bituminous emulsion which comprises mixing heated aggregate and liquefied asphalt to coat said aggregate with asphalt, mixing said coated aggregate with a solution of water containing an emulsifying agent, evaporating a portion of said water whereby a film of water is disposed intermediate the particles of asphalt coated aggregate.

2. A process for producing an asphaltic composition adapted for paving roads and containing an oil continuous type bituminous emulsion which comprises mixing heated stone and melted asphalt to coat said stone with asphalt, mixing said heated coated stone with a solution of water containing an emulsifying agent, evaporating a portion of said water whereby a film of water is disposed intermediate the particles of asphalt coated stone.

3. A process for producing an asphaltic composition adapted for paving roads which comprises coating aggregate with asphalt, mixing said coated aggregate with approximately 4% by weight of water containing 0.5% caustic alkali and vaporizing a portion of the water in said mixture whereby an asphaltic composition is produced comprising a plurality of asphalt coated aggregate provided with a film of water intermediate the particles of coated aggregate.

4. A process for producing an asphaltic composition adapted for paving roads which comprises heating stone to approximately 250° F., coating said stone with approximately 5% by weight of melted asphalt, mixing said coated stone with approximately 4% by weight of water containing 0.5% of caustic alkali, vaporizing approximately 50% of said water in said mixing whereby an asphaltic composition is produced comprising a plurality of asphalt coated stone particles provided with a film of water intermediate the particles of coated stone.

5. An asphaltic composition adapted for paving roads which comprises a mixture of aggregate, asphalt, an aqueous solution containing an emulsifying agent, and an agent favoring the formation of an oil continuous type asphaltic emulsion, said agent being selected from the class consisting of calcium, barium and magnesium hydroxides and soluble alkaline earth metal chlorides, nitrates and sulfates.

ULRIC B. BRAY.